Dec. 9, 1958 J. A. TALTAVALL, JR 2,863,680
MECHANICAL SEAL FOR PUMPS
Filed Aug. 17, 1955 2 Sheets-Sheet 1

INVENTOR.
John A. Taltavall, Jr.
BY Harold L. Gammons
AGENT

Dec. 9, 1958    J. A. TALTAVALL, JR    2,863,680
MECHANICAL SEAL FOR PUMPS
Filed Aug. 17, 1955    2 Sheets-Sheet 2

INVENTOR.
John A. Taltavall, Jr.
BY Harold L. Gammans
AGENT

United States Patent Office 2,863,680
Patented Dec. 9, 1958

2,863,680

MECHANICAL SEAL FOR PUMPS

John A. Taltavall, Jr., Morgan, N. J., assignor to National Lead Company, New York, N. Y., a corporation of New Jersey Application August 17, 1955, Serial No. 529,061

4 Claims. (Cl. 286—11.15)

The present invention relates in general to pump seals and more particularly to a mechanical seal for pumps and is an improvement over the mechanical seal shown and described in applicant's copending application Serial No. 365,181 filed June 30, 1953, and issued as U. S. Patent No. 2,802,679 on August 13, 1957.

As described in the aforementioned application, mechanical seals for rotary shafts, and in particular the rotary shafts of centrifugal pumps, may be divided into two general classes, namely inside seals and outside seals. A modification of these two basic types of mechanical seals is the so-called balanced seal. Although these mechanical seals are widely used, each has limitations which restrict its application. Thus, whereas the inside seal is ideal for high presure allocations, this type of seal is not adjustable exteriorally of the pump housing, and hence adjustments can be made only by disassembling the pump. Moreover, mechanical seals of the inside seal type embody many relatively small parts such as springs, set screws and the like, which are continually subject to attack by corrosive liquids. The outside seal has the advantage of outside adjustments, but is essentially a low pressure seal; while the so-called balanced seal is limited by the construction of its passage ways to use with substantially clear liquids.

The mechanical seal disclosed in the aforesaid application was developed to include all of the advantages of an inside seal with few or none of its disadvantages.

While this seal has proved to be superior to any of the previously known types of rotary shaft packing, further research and design studies have culminated in the development of a mechanical seal of even superior attributes.

An object of the present invention is to provide a relatively simple, economical and versatile mechanical seal for rotary pump shafts.

A further object of the invention is to provide a superior mechanical seal for rotary pump shafts wherein the sealing elements of the mechanical seal are designed to permit replacement and repair of worn parts with facility and dispatch.

A still further object of the invention is to provide a superior mechanical seal for rotary pump shafts wherein sealing elements of various designs may be used interchangeably to increase the versatility and usefulness of the mechanical seal.

A still further object of the invention is to provide a superior mechanical seal of relatively simple and economical construction adapted to accommodate interchangeable sealing elements capable of being adjusted externally of the mechanical seal housing and operable continuously over extended periods of time without leakage or breakdown.

These and other objects, features and advantages of the invention will be described hereinafter in more detail with reference to the accompanying drawings in which.

Figures 1, 2:
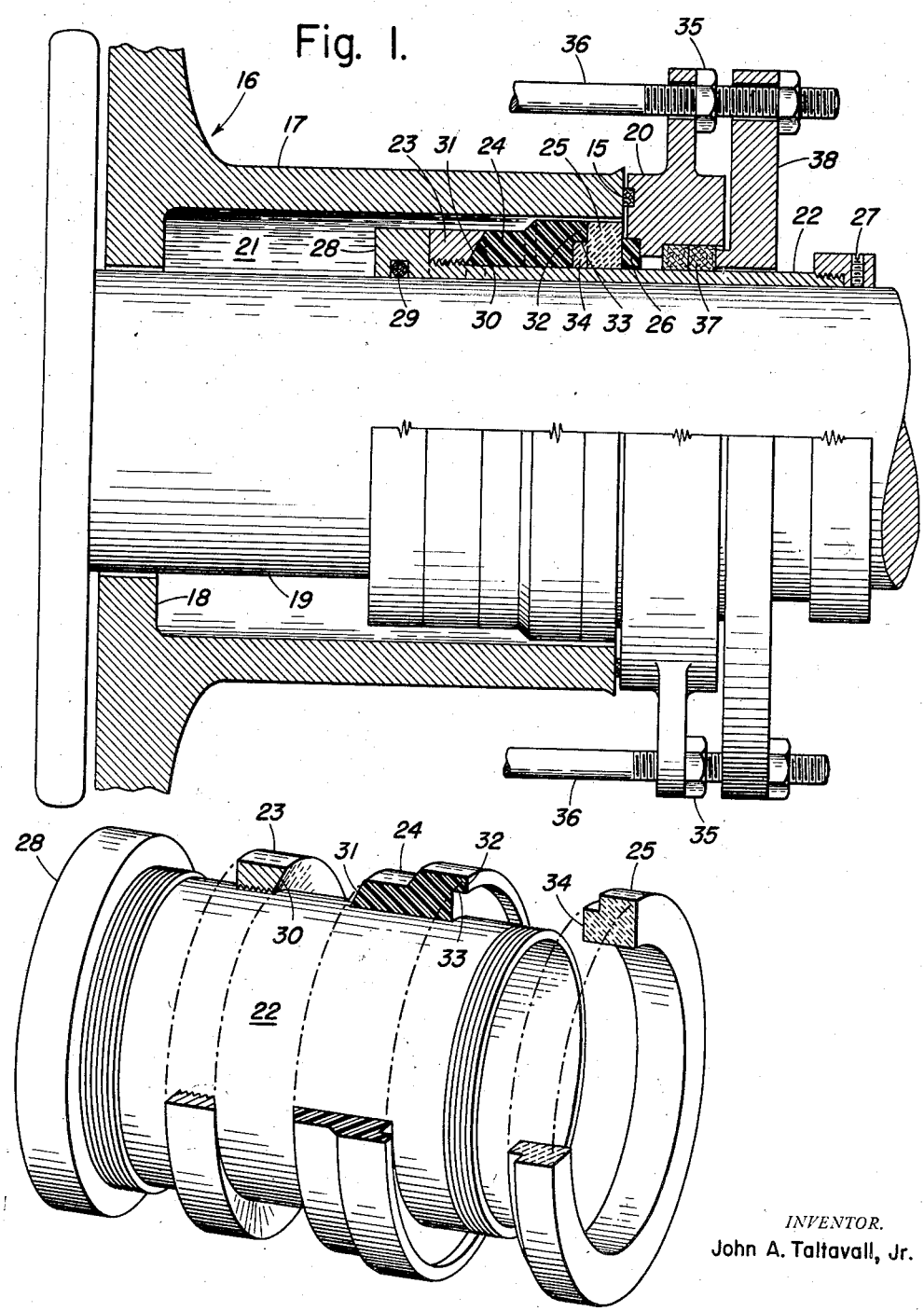
Figure 1 is a fragmentary view, partly in section, of the mechanical seal of this invention as used on the rotary shaft of a centrifugal pump.
Figure 2 is an exploded view, partly in section, of the sealing elements of the mechanical seal shown in Figure 1.

Although it is within the purview of the invention to utilize the mechanical seal hereinafter described for rotary shafts other than the shaft of a centrifugal pump, the mechanical seal has found its most important applications with centrifugal pumps and hence will be described in this setting, but it will be understood that the mechanical seal may be adapted to other equivalent installations.

Referring to the drawings, the numeral 16 identifies the substantially cup-shaped hub housing of a centrifugal pump casing, the housing 16 having substantially straight cylindrical side walls 17 and a centrally apertured inboard end wall 18, the central aperture of which accommodates the pump impeller shaft 19. The outboard end of the cup-shaped housing 16 is open, its outer face being adapted to form a bearing surface for an O ring 15 carried by the adjustable end wall 20 of the housing, as hereinafter described. For other details of the pump itself, including the drive mechanism, reference may be had to applicant's aforementioned copending application.

As shown, the inside diameter of the housing 16 exceeds the diameter of the impeller shaft 19 by an amount sufficient to provide an annular clearance space 21, sometimes hereinafter referred to as the seal chamber, between the impeller shaft and the inside wall of the housing. This annular clearance space or seal chamber is adapted to accommodate the elements of the internal mechanical seal of this invention. These elements comprise a metal seal sleeve 22, a sealing ring assembly which, in the embodiment shown in Figures 1 and 2, comprises a metal adaptor ring 23, and a set of nested sealing rings identified as the elements 24 and 25, and a wear plate 26. As indicated clearly in Figure 1, these several elements of the mechanical seal are adapted to be assembled in the annular clearance space or seal chamber 21 to provide a fluid tight seal between the open end of the housing 16 and the adjustable end wall 20 thereof.

Turning now to a description of the individual elements of the mechanical seal, the seal sleeve 22 is preferably formed of a metal suitable for the service to which the pump is to be put. Thus, the seal sleeve 22 may be formed of brass when used for pumping water or may be formed of such metals as stainless steel or lead when used for pumping slurries or acids. The seal sleeve 22 is designed to fit on the impeller shaft 19 with a snug fit and to rotate therewith, and to this end a set screw, key or the like, as indicated at 27, is provided on the outboard end of the sleeve to positively lock the sleeve to the shaft against rotation relative thereto, as well as against movement longitudinally thereof. At its inboard end, which as shown terminates short of the inboard apertured end wall of the housing 16, the sleeve is provided with an annular flange 28, the diameter of which is somewhat less than the inside diameter of the housing 16 so as to provide clearance between the inner wall of the housing and the peripheral surface of the seal sleeve flange 28. An annular groove 29 is formed on the inner wall of the flanged end portion of the seal sleeve 22 to accommodate an O ring or similar packing material for forming a fluid tight seal between the inboard end of the seal sleeve and the pump shaft.

A plurality of screw threads is provided on the seal sleeve 22 at the base of its flange 28 for accommodating the aforesaid metal adaptor ring 23, the inner peripheral wall of which is provided with screw threads by which the adaptor ring 23 may be threaded onto the seal sleeve 22 or removed therefrom with facility and dispatch. As shown especially well in Figure 1, the outside diameter of the adaptor ring corresponds to that of the seal sleeve flange 28, while the inboard face of the adaptor ring lies in a plane substantially parallel to the plane of the outboard face of the flange. Thus, by threading the adaptor ring 23 onto the seal sleeve, the inboard face of the ring may be brought into tight sealing engagement with the outboard face of the flange 28. The outboard face of the adaptor ring 23 is provided with an inwardly bevelled annular surface 30 which provides a seat for an externally bevelled annular surface 31 of substantially the same diameter, provided on the inboard end of the sealing ring 24. The internal diameter of the sealing ring 24 corresponds substantially to the outside diameter of the seal sleeve 22 so that the sealing ring 24 makes a snug sliding fit thereon for rotation therewith. The outside diameter of the sealing ring 24, at its inboard end, corresponds to the outside diameter of the adaptor ring 23 while the outboard end of the sealing ring 24 is provided with an integral annular flange 32, the outside diameter of which is only slightly less than the inside diameter of the housing 16. As shown especially well in Figure 2, the outer face of the flanged portion 32 of the sealing ring 24 is provided with a counterbore 33 which constitutes a seat for an annular rib 34 which projects from the inboard face of the companion sealing ring 25. The latter, like the sealing ring 24, is designed to fit snugly on the seal sleeve 22 and to rotate therewith.

Both sealing rings 24 and 25 are formed preferably of a non-metallic material, as for example, resilient materials, although the resilient materials used in forming the respective rings need not necessarily be identical. Experience has shown, for example, that the sealing ring 24 should be more resilient and flexible than the sealing ring 25, and consequently it is preferred to form the sealing ring 24 of a soft flexible rubber, neoprene or a similar type of material whereas the sealing ring 25 is preferably relatively stiff and may comprise relatively hard plastic, Teflon, loaded Teflon, i. e. Teflon impregnated with zirconium, glass, graphite and the like, or the sealing ring 25 may be formed wholly of graphite.

The third element of the mechanical seal is the aforementioned wear plate 26 which, as indicated clearly in Figure 1, is an annulus substantially rectangular in cross section adapted to be secured on the inboard face of the adjustable end wall 20 of the housing 16. The wear plate 26 is preferably secured thereon by being engaged by a press fit in an annular notch of corresponding cross section in the end wall 20, or otherwise secured therein against rotation relative thereto, and is formed of any suitable material such as, for example, metal, hard rubber, Teflon, or the like, the inboard face of the wear plate 26 being lapped and adapted to make a fluid-tight seal with the outboard face of the sealing ring 25. In accordance with this construction, the wear plate may be readily removed when worn and replaced by a new wear plate.

As mentioned above, the internal mechanical seal is characterized by adjusting means whereby a fluid-tight seal is maintained between the internal sealing elements of the mechanical seal and the inboard face of the adjustable end wall 20 of the housing, the adjustment of the aforesaid end wall 20 relative to the housing and the seal being effected by means of adjusting nuts 35 threaded onto the respective studs 36 projecting from the pump housing. By turning up the nuts 35, the end wall 20, and in particular the lapped inboard bearing surface of the wear plate 26 may be moved to and from the juxtaposed outer surface of the sealing ring 25, thereby to vary the pressure between these mutually engaging surfaces for maintaining a fluid-tight seal therebetween. It will be obvious also that when making adjustments of the end wall 20 relative to the internal sealing elements of the mechanical seal, an adjustment is also effected in the fluid-tight joint between the rubber O ring and the outboard end of the housing 16.

Other features which may be mentioned as constituting elements of the instant invention is the auxiliary external packing 37 seated in a counterbore in an outboard face of the adjustable end wall 20 and held therein by an adjustable packing gland 38. The auxiliary packing 37 is adapted thus to form a fluid-tight seal with the outer peripheral surface of the seal sleeve. In addition to the external adjustment of the internal mechanical seal provided by the adjustable end wall 20, the aforesaid sealing sleeve 22 provides internal adjusting means for adjusting the internal mechanical seal. Thus, assuming the adjustable end wall 20 to be fixed, then by loosening the set screw 27 of the seal sleeve 22, the latter may be moved longitudinally of the impeller shaft 19 in an outboard direction, for example, so as to increase the pressure exerted between the outboard bearing face of the sealing ring 25 and the lapped inboard face of the wear plate 26, thereby taking up any wear between these mutually engaging sealing surfaces, and insuring a fluid-tight seal therebetween.

The assembly of the internal sealing elements of the mechanical seal in the pump housing is patent from the illustration but briefly embodies the steps of threading the adaptor ring 23 on the threaded portion of the seal sleeve 22 into abutting engagement with the flange 28 thereof, thereafter slipping the two sealing rings 24 and 25 over the outboard end of the seal sleeve, and sliding these rings forward until the bevelled inboard end of the sealing ring 24 seats on the annular bevel of the adaptor ring 23. Thereafter, the adjustable end wall 20 of the housing may be moved into place, and by suitable adjustments of the end wall and the seal sleeve, as hereinabove described, an effective fluid-tight seal may be effected between the sealing elements of the mechanical seal and the shaft housing to preclude leakage of liquid therefrom. The simplicity by which the assembly and disassembly of the sealing elements of the mechanical seal is effected is apparent. Should any of the elements of the seal fail, then it is a matter of but a few moments time to remove the end wall of the housing, slide the worn or defective sealing element off the outboard end of the sealing sleeve, and replace the worn or defective sealing element with a new part.

Figures 3, 4:
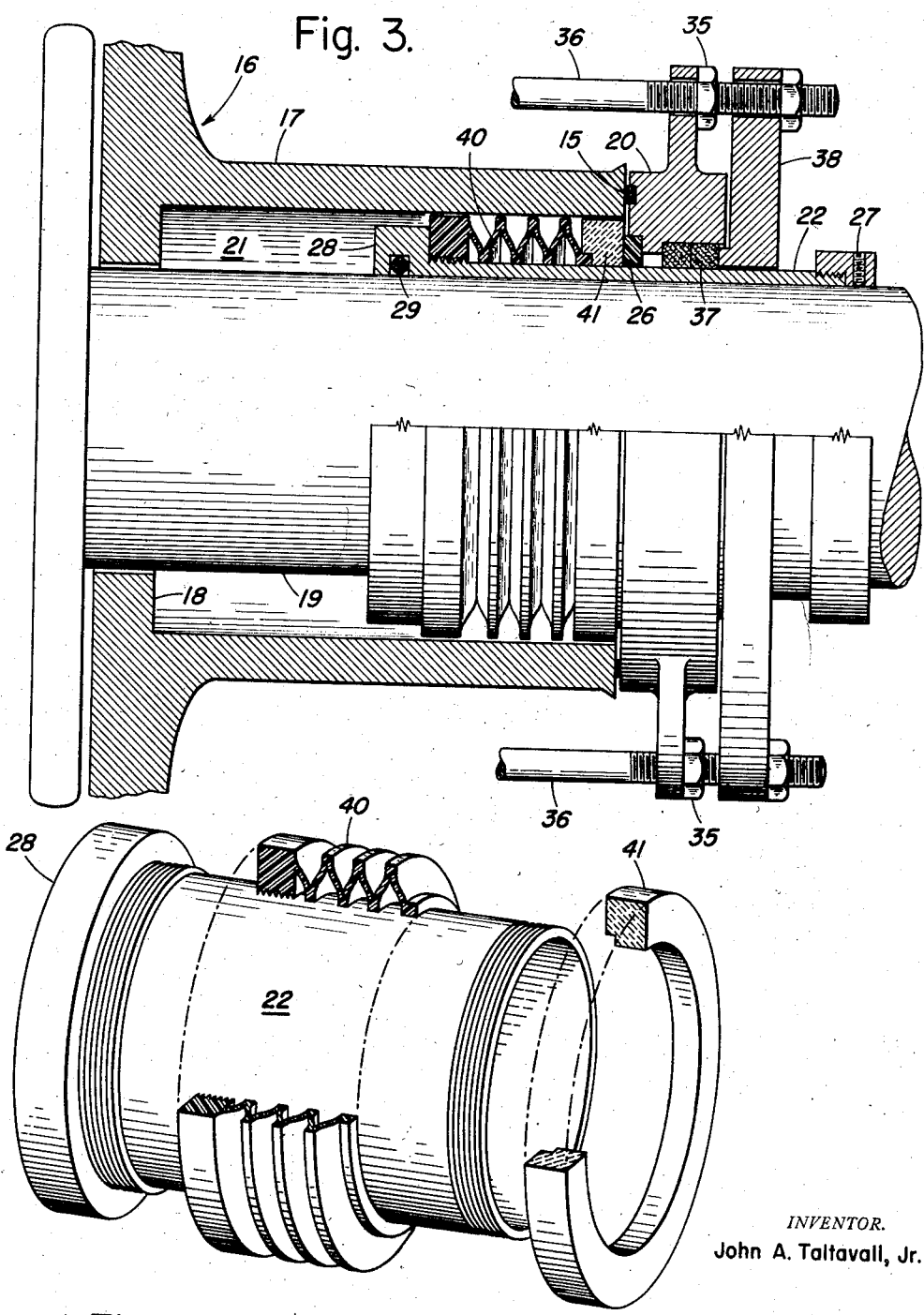
Figure 3 is a fragmentary view, partly in section, of a modification of the mechanical seal shown in Figure 1.
Figure 4 is an exploded view, partly in section, of the sealing elements used in the modified mechanical seal of Figure 3.

This adaptability of the improved mechanical seal of this invention to repair when needed also lends itself to increasing the versatility of the mechanical seal for use with various kinds of fluids and for various operating conditions. Thus, Figures 3 and 4 show a modification of the sealing elements of the mechanical seal designed to be interchangeable with the sealing elements disclosed in Figures 1 and 2. The sealing elements shown in Figures 3 and 4 comprise, in addition to the seal sleeve 22, which is identical to that shown in Figures 1 and 2, a sealing ring assembly comprising a bellows type sealing ring 40 and a companion sealing ring 41, both of which are designed like the sealing ring assembly of Figures 1 and 2 to make a smooth sliding fit on the seal sleeve 22. As shown especially well in Figure 4, the inboard end of the bellows type sealing ring is formed with an integral adaptor ring-portion internally threaded so as to be threadedly engaged on the threaded portion of the seal sleeve 22 with the outside diameter of the adaptor ring-portion of the bellows type sealing ring corresponding substantially to the outside diameter of the flange 28 of the seal sleeve. The opposite or outboard end of the bellows type sealing ring is provided with an integral annular rib which is adapted to engage in a counterbore in the opposed inboard face of the companion sealing ring 41 which, like the sealing ring 25 in Figures 1 and 2, fits snugly on the seal sleeve 22 and is adapted to engage its outboard face with the lapped inboard surface of the wear plate 26 to form a fluid-tight seal therewith. The bellows type sealing ring 40 and its companion sealing ring 41 are formed of suitable materials selected in accordance with the expected use of the pump, suitable materials being, for example, metal, rubber, Teflon and the like. Thus, the bellows type sealing ring 40 may be formed of metal where the likelihood of the metal being attacked by the fluid being pumped is small. However, it is preferred to form the bellows type sealing ring of Teflon or a similar material resistant to attack and deterioration by corrosive fluids. The companion sealing ring 41 may likewise be formed of Teflon or a loaded Teflon, although plastics, graphite or other suitable materials may be used.

The operation of the modified sealing elements of Figures 3 and 4 is substantially similar to the operation of the sealing elements shown in Figures 1 and 2. It is noteworthy, however, that the bellows type sealing ring, due to its bellows type construction possesses a greater degree of flexibility in a direction of its longitudinal axis and hence may have applications where the more rigid type of sealing elements of Figures 1 and 2 would be less satisfactory. However, due to the interchangeability of the sealing ring assemblies, the mechanical seal may be adapted to a relatively wide range of applications with facility and dispatch. Moreover, it is evident that the mechanical seal of this invention is characterized by the inside seal which may be adjusted exteriorly of the pump housing; and by an outside seal, the latter being arranged exteriorly of the pump housing and adjustable independently of the adjusting means of the inside seal.

The mechanical seal of this invention, therefore, provides an efficient seal for the handling of corrosive liquids and highly abrasive liquid suspensions, and because of the adjustable and interchangeable features of the sealing elements of the seal, and in particular the ease with which adjustments may be made and worn or broken parts replaced, the efficiency of operation of the mechanical seal is outstanding.

While this invention has been described and illustrated by the examples shown, it is not intended to be strictly limited thereto, and other variations and modifications may be employed within the scope of the following claims.

I claim:

1. A mechanical seal for the rotating shaft of a fluid pump comprising in combination: a pump shaft housing having a sealed end wall and a pump shaft extending through said housing and said sealed end wall, adjustable sealing means for providing a fluid-tight joint between said shaft and the sealed end wall of said housing, said adjustable sealing means comprising a wear plate secured on the inner face of the sealed end wall of said housing, a sleeve mounted on said shaft, a sealing ring at the inboard end of said sleeve between said sleeve and said shaft, and a sealing ring assembly arranged to be mounted on the inboard end of said sleeve for rotation therewith, said sealing ring assembly comprising a second sealing ring and an adaptor, said adaptor being constructed and arranged to be removably secured to said sleeve to hold said second sealing ring adjacent the wear plate on the sealed end wall of said housing, said sleeve being constructed and arranged to be rotated by said shaft and to be movable longitudinally thereof to engage and releasably hold the second sealing ring of said sealing ring assembly in sealing engagement with the wear plate on the sealed end wall of said housing to form a fluid-tight joint therewith.

2. A mechanical seal for the rotating shaft of a fluid pump comprising in combination: a pump shaft housing having a sealed end wall and a pump shaft extending through said housing and said end wall, adjustable sealing means for providing a fluid-tight joint between said shaft and the sealed end wall of said housing, said adjustable sealing means comprising a wear plate secured on the inner face of the end wall of said housing, a sleeve mounted on said shaft, said sleeve having an annular flange at its inner end and screw threads on said sleeve adjacent the base of said flange, a sealing ring mounted in the flanged-end of said sleeve between said sleeve and said shaft, a sealing ring assembly arranged to be mounted on the inboard end of said sleeve for rotation therewith, said sealing ring assembly comprising a second sealing ring and an adaptor, said adaptor being arranged to threadedly engage the screw threads of said sleeve, thereby to removably secure said adaptor to said sleeve for rotation therewith, and to hold said second sealing ring adjacent the wear plate on the sealed end wall of said housing, and fastening means on said sleeve exteriorly of said housing arranged to releasably secure said sleeve to said shaft at selected positions longitudinally thereof and for rotation therewith, thereby to engage and hold the said second sealing ring of said sealing ring assembly in sealing engagement with the wear plate on the sealed end wall of said housing to form a fluid-tight joint therewith.

3. A mechanical seal for the rotating shaft of a fluid pump comprising in combination: a pump shaft housing having a sealed end wall and a pump shaft extending through said housing and said end wall, adjustable sealing means for providing a fluid-tight joint between said shaft and the sealed end wall of said housing, said adjustable sealing means comprising a wear plate secured on the inner face of the end wall of said housing, a sleeve mounted on said shaft, said sleeve having an annular flange at its inner end and screw threads on said sleeve adjacent the base of said flange, a sealing ring mounted in the flanged-end of said sleeve between said sleeve and said shaft, a sealing ring assembly arranged to be mounted on the inboard end of said sleeve for rotation therewith, said sealing ring assembly comprising a pair of sealing rings mounted on said sleeve and an adaptor, said adaptor being constructed and arranged to threadedly engage the threads of said sleeve to removably secure said adaptor to said sleeve and to hold said pair of sealing rings on said sleeve between said flange and the wear plate on the end wall of said housing, and fastening means carried by said sleeve exteriorly of said housing arranged to releasably secure said sleeve to said shaft at selected positions longitudinally thereof and for rotation therewith, thereby to engage and hold one of said pair of sealing rings in sealing engagement with the wear plate on the sealed end wall of said housing to form a fluid-tight joint therewith.

4. A mechanical seal for the rotating shaft of a fluid pump comprising in combination: a pump shaft housing having a sealed end wall and a pump shaft extending through said housing and said end wall, adjustable sealing means for providing a fluid-tight joint between said shaft and the sealed end wall of said housing, said adjustable sealing means comprising a wear plate secured on the inner face of the end wall of said housing, a sleeve mounted on said shaft, said sleeve having an annular flange at its inner end and screw threads on said sleeve adjacent the base of said flange, a sealing ring mounted in the flanged-end of said sleeve between said sleeve and said shaft, a sealing ring assembly arranged to be mounted on the inboard end of said sleeve for rotation therewith, said sealing ring assembly comprising a bellows type sealing ring and a companion sealing ring, said bellows type sealing ring having an integral adaptor arranged to threadedly engage the screw threads of said sleeve to removably secure said bellows type sealing ring to said sleeve, and to hold said companion sealing ring adjacent the wear plate on the sealed end wall of said housing, and fastening means carried by said sleeve exteriorly of said housing arranged to releasably secure said sleeve to said shaft at selected positions longitudinally thereof and for rotation therewith, thereby to engage and hold said companion sealing ring in sealing engagement with the wear plate on the sealed end wall of said housing to form a fluid-tight joint therewith.

References Cited in the file of this patent

UNITED STATES PATENTS

| | | |
|---|---|---|
| 589,725 | Hodge et al. | Sept. 7, 1897 |
| 675,019 | Saxton | May 28, 1901 |
| 836,408 | Somes | Nov. 20, 1906 |
| 1,363,378 | Vuilleumier | Dec. 28, 1920 |
| 1,618,882 | Kendall | Feb. 22, 1927 |
| 2,306,417 | Weissner | Dec. 29, 1942 |
| 2,349,024 | Waddell | May 16, 1944 |

OTHER REFERENCES

"The Cameron Pump Shaft Seal," Ingersoll-Rand Bulletin 7018, page 2 relied upon. Received U. S. Patent Office 1943. (Copy available in Scientific Library and Div. 9.)